May 6, 1952 J. A. SIMPSON, JR 2,595,550
RADIATION COUNTER

Filed May 22, 1945 5 Sheets-Sheet 1

Witnesses:
William J. Ruano
Henry W. Johnson

Inventor:
John A. Simpson, Jr.
By Robert A. Lavender
Attorney

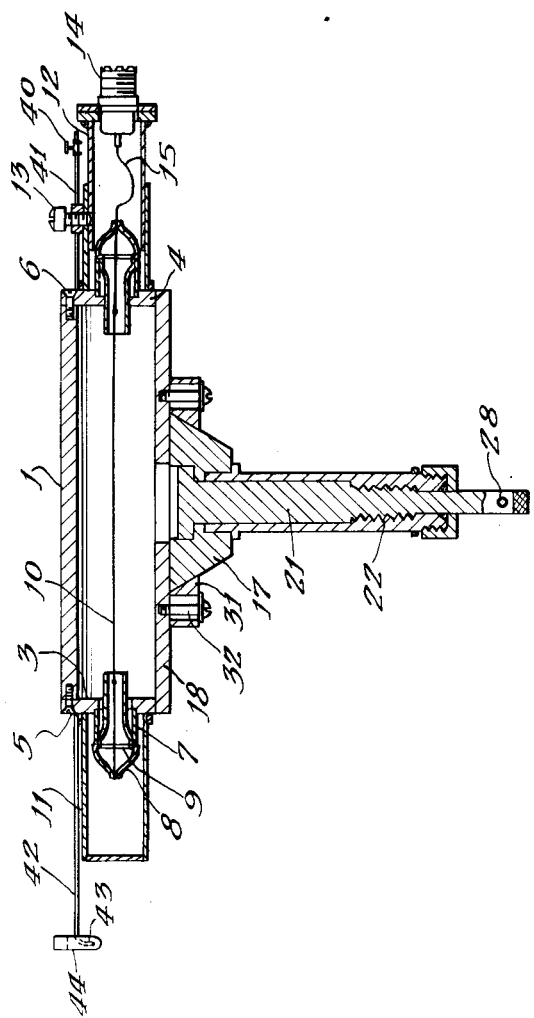

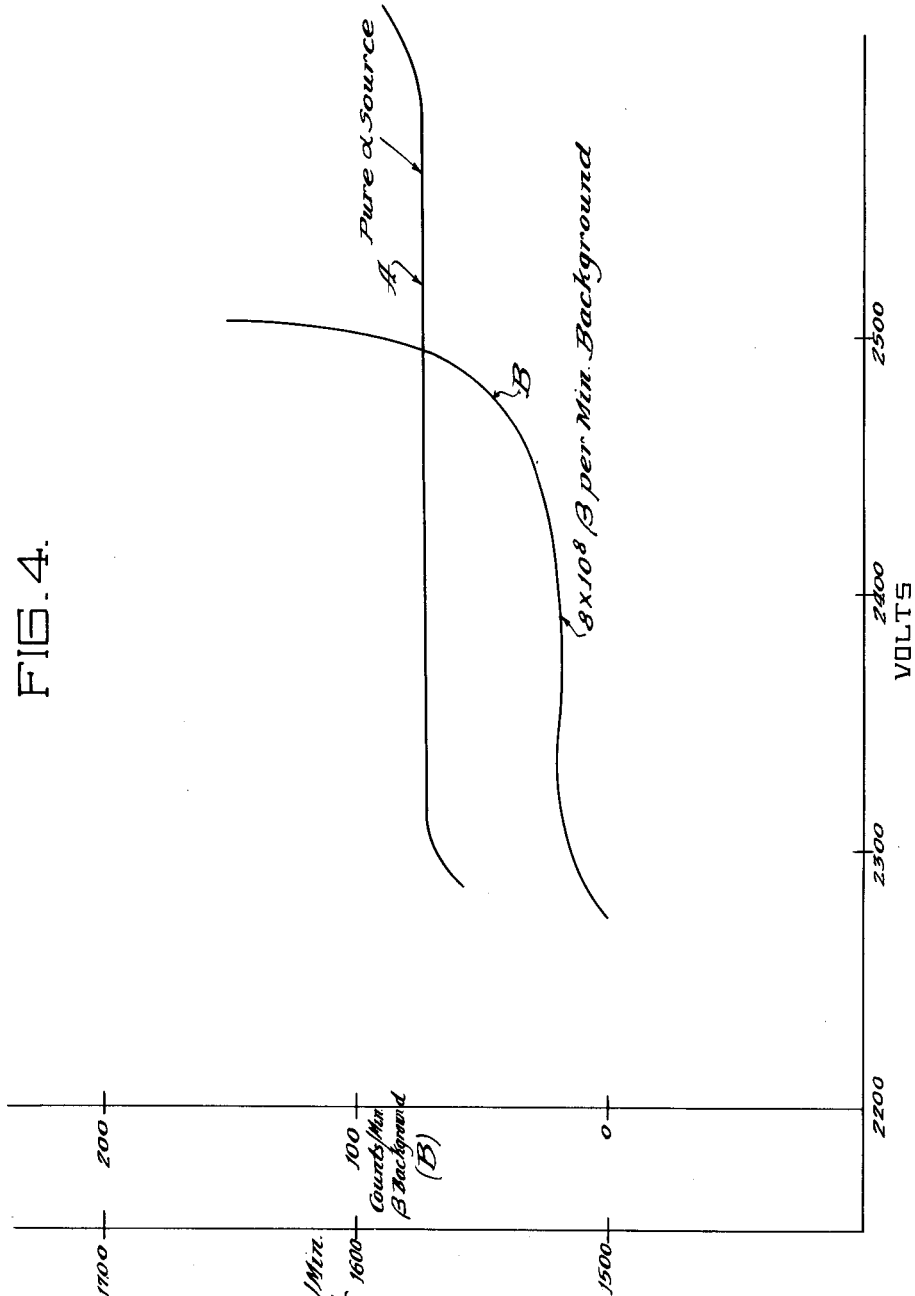

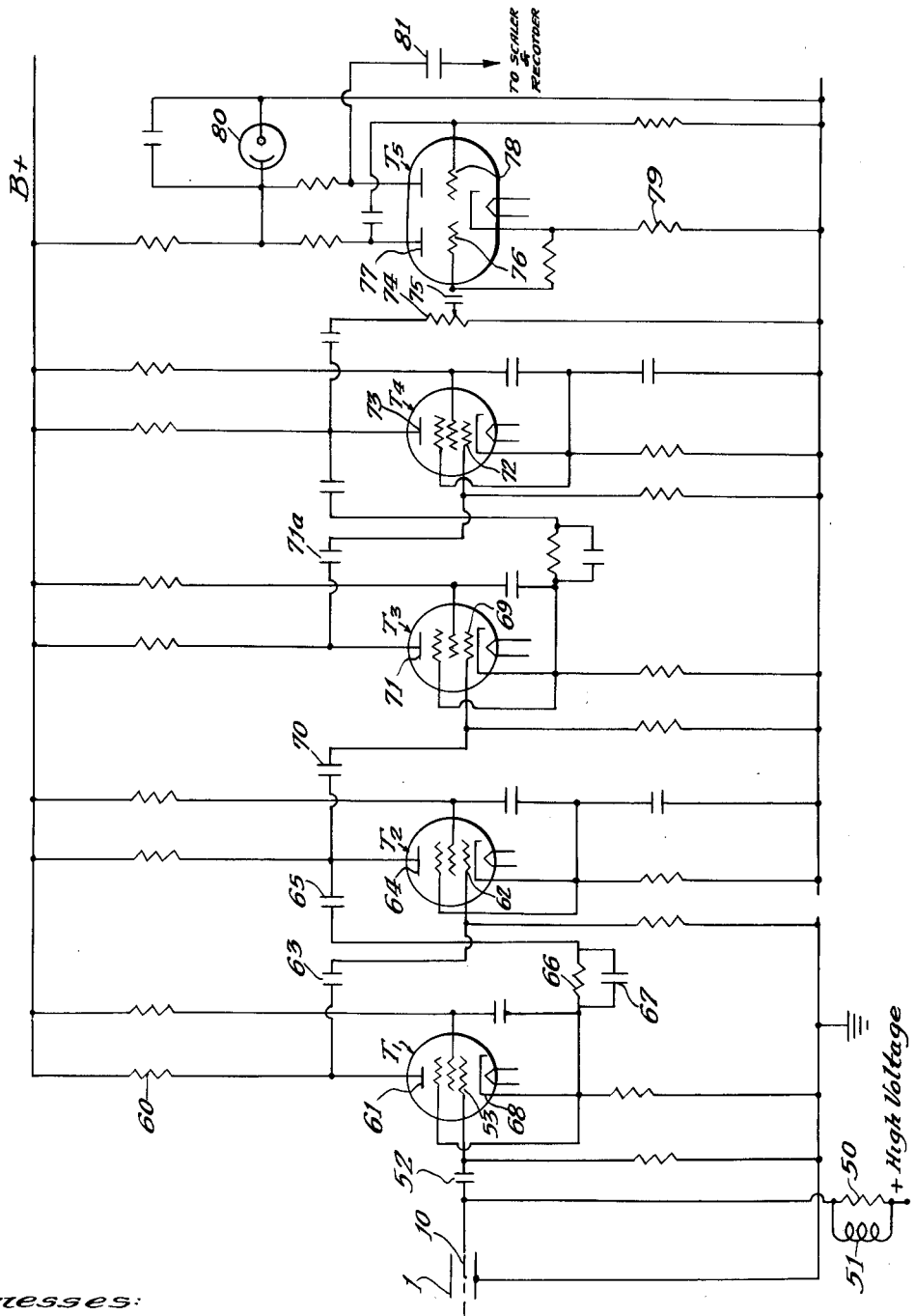

May 6, 1952      J. A. SIMPSON, JR      2,595,550
RADIATION COUNTER
Filed May 22, 1945      5 Sheets-Sheet 5
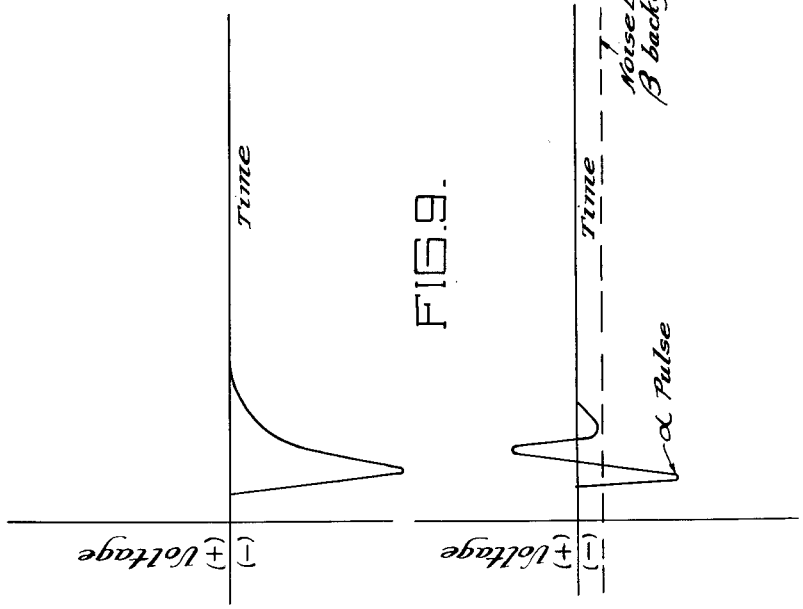
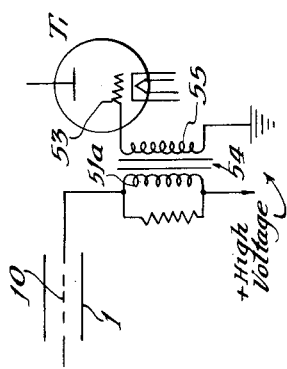
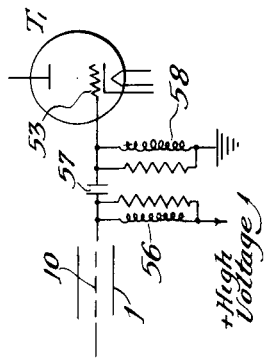
Witnesses:
Inventor:
John A. Simpson, Jr.
By: Robert A. [Attorney signature]
Attorney.

Patented May 6, 1952

2,595,550

UNITED STATES PATENT OFFICE 2,595,550

RADIATION COUNTER

John A. Simpson, Jr., Chicago, Ill., assignor to the United States of America as represented by the United States Atomic Energy Commission Application May 22, 1945, Serial No. 595,192

12 Claims. (Cl. 313—54)

My invention reates broadly to a radiation counter tube and circuit, and more specifically to a proportional counter tube and circuit for measuring the intensity of alpha particles even in the presence of a high beta ray background.

In the past, radiation counter tubes, such as the proportional and Geiger-Müller types, have been so constructed that the radioactive sample was adapted to be placed exteriorly of the tube either in the form of a thin foil wrapped therearound or in the form of a small sample placed outside and adjacent to a thin metal, glass, or mica portion of the tube wall serving as a window. The window portion was generally made thin to reduce the radiation absorbed thereby. However, in all cases, there has been an error introduced due to this absorption of radiation by the window resulting in a decrease of sensitivity of the tube making it ineffective for detecting weak radiations.

A well-known type of radiation counter tube is the proportional counter tube usually comprising a gas or vapor filled chamber which encloses a fine center-wire electrode. The center wire electrode is surrounded by a cylindrical electrode and a high potential gradient is provided between the electrode to create an electric field which is so high that electrons from an ionizing event will cause ionization of gas or vapor molecules by collision, and consequently a multiplication of the initial charge by some large factor will be produced. Since this charge is approximately proportional to the initial ionization, the device is referred to as a "proportional" counter. The size of the electric pulse transmitted by the counter tube to the input of an amplifier is thus proportional to the number of ions formed in the counter. Proportional counters are generally used for detecting alpha particles, fission fragments and protons. Difficulties arise when a proportional counter is used to detect alpha particles when a high beta ray or gamma ray background is present. Alpha particles produce, roughly, 30,000 ion pairs in air per centimeter. Beta rays, on the other hand, produce only a small fraction of this number of ion pairs, perhaps in the neighborhood of $\frac{1}{50}$ as many, but have ranges which are considerably greater than those of alpha particles. Hence, two distinct pulse distributions may be obtained, the alpha pulses being much larger than the betas. It is this selective effect that makes the proportional counter so useful in counting alpha particles in the presence of $\beta$ rays. In a magnetic, parallel plate type of alpha counter chamber, a plurality of beta rays of different energy may accumulate in a time equal to the overall resolution time and have the same ionizing effect as would a single alpha particle, thus making it difficult to distinguish these two types of radiation.

In the past amplifiers having a narrow band of frequency response have been used generally with alpha counters of the proportional and magnetic, parallel plate types. In general, amplifiers having a frequency response of under $10^5$ cycles per second have been so used because it was felt that low frequency narrow band amplifiers were the most suitable for use with alpha counters. By the use of pulse height selectors, it has been possible to electronically cut off the relatively small signals due to beta rays, thereby transmitting only the larger signals due to alpha particles. However, by the use of narrow, low frequency band amplifiers, the steep wave fronts of the pulses formed on the center-wire of the counter are not maintained throughout the amplifier, that is, the slope, instead, becomes more gradual and the pulse becomes wider with the result that radiations having high counting rates cannot be accurately measured, and the transmitted pulse in the amplifier in many cases is very similar to that of a plurality of superimposed beta particles with the result that alpha particle counts are confused with, and not effectively separated from beta radiation counts. Furthermore, in the past, proportional counters have had either high geometry such that they would intercept of the order of 50 per cent of the radiation emanations or high tolerable beta background. As far as I am aware, no individual counter had both of these desirable characteristics simultaneously.

An object of my invention is to provide a reproducible radiation counter tube, such as a proportional counter tube, which is devoid of the above named disadvantages of tubes disclosed in the prior art.

A further object of my invention is to provide a proportional counter tube of high sensitivity which has high geometry and high tolerable beta background.

A more specific object of my invention is to provide a proportional counter tube of such construction that a radioactive sample may be readily inserted into the chamber or withdrawn to the exterior of the chamber without the necessity of disassembling any of the parts of the tube.

A more specific object of my invention is to provide a radiation counter tube, such as of the proportional type, with a gas-tight supporting structure for the sample which supporting structure is slidable with respect to a wall portion of the tube and radially adjustable with respect to the center-wire electrode.

Another object of my invention is to provide means for continually circulating a gas through a radiation counter tube together with simple means for visibly ascertaining the flow rate of the gas through the tube.

Another object of my invention is to provide an amplifier and an input circuit therefor such as to cause maintenance of the steep wave front of the pulse of the counter throughout the entire amplifier so as to give a faithful reproduction of the sharp pulse form caused by alpha particles and to maintain relatively high resolution throughout the circuit.

Another object of my invention is to provide a stable amplifier and input circuit therefor for use with a proportional counter tube such that alpha particles may be effectively separated and detected independently of beta rays despite the fact that a high background of beta rays exist, for example, of the order of $10^9$ per minute.

Other objects and advantages will become apparent from the following specification taken with the drawings wherein:

Fig. 3 is a view principally in section taken along line 3—3 of Fig. 1;

Fig. 4 is a graph of counting rate plotted as ordinates versus applied voltage for the counter tube illustrated in Figs. 1, 2 and 3 using methane ($CH_4$) at one atmosphere;

Fig. 5 is a circuit diagram of a wide frequency band, linear amplifier including a novel input circuit connected to an alpha counter tube, such as illustrated in Figs. 1, 2 and 3 inclusive;

Fig. 6 is a schematic illustration of a modified form of amplifier input circuit that may be used instead of that shown in Fig. 5;

Fig. 7 is a schematic illustration of a still further modified form of amplifier input circuit over that shown in Fig. 5;

Fig. 8 is a graph of voltage plotted as ordinates versus time of a pulse appearing in an input circuit having pure resistance; and Fig. 9 is a graph of voltage plotted as ordinates versus time showing a pulse in an amplifier input circuit having a resistance shunted by an inductance.

Figure 1:
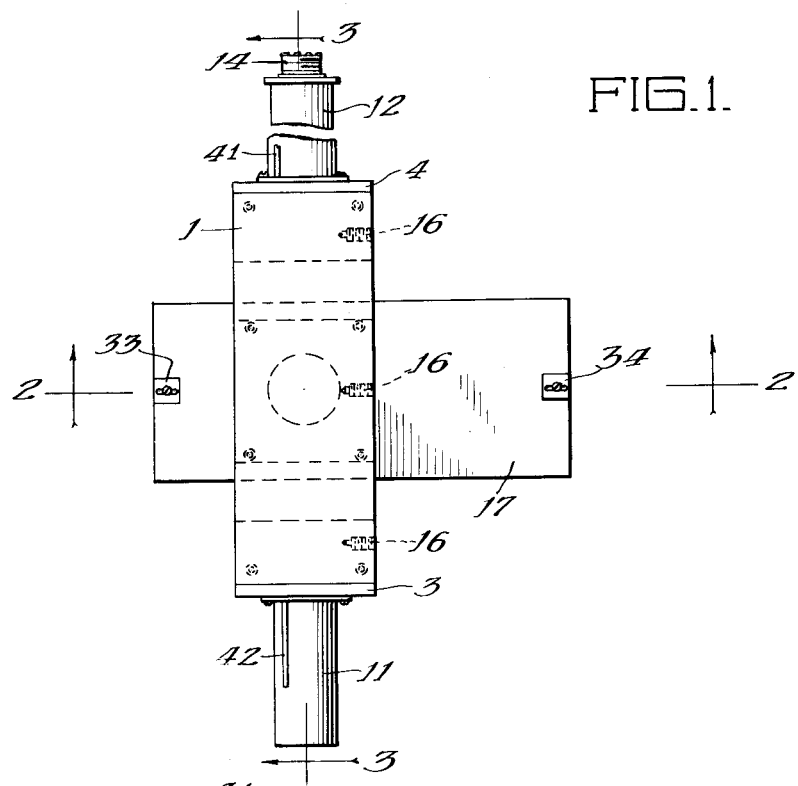
Fig. 1 is a top plan view of an alpha counter tube embodying the teachings of my invention.
Figure 2:
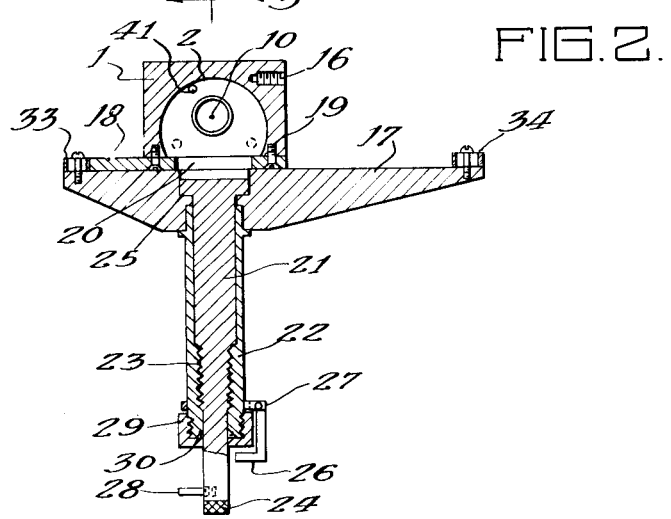
Fig. 2 is a sectional view taken along line 2—2 of Fig. 1.

Referring more particularly to Figs. 1 to 3, inclusive, numeral 1 denotes an elongated block of metal, such as brass, which has been bored and polished internally to form a somewhat cylindrical chamber defined by the interior wall 2. The block 1 has a longitudinal segment cut off from the bottom, as illustrated, so that the wall 2 does not form a complete cylindrical surface but forms a cathode surface which is slightly larger than a semi-cylindrical surface so that when a sample is inserted in the tube, the top layer of the sample will in all probability extend within the periphery of the cylindrical surface portion of wall 2, as will appear more clearly hereinafter. End plates 3 and 4 are secured to the ends of block 1 by means of a plurality of screws such as 5 and 6, respectively. A small metallic cylinder 7 made of Kovar, Fernico, or other metal having thermal expansion characteristics similar to that of glass is sweat-soldered to end plate 3 and is fused to a glass tube 8 that extends in both directions through the cylinder 7. A lead-in wire 9 of Kovar or similar metal is sealed to the outwardly extending portion of and centrally supported by glass tube 8. The inner end of wire 9 is connected to a thin wire 10 made, for example, of tungsten which serves as the anode. A suitable diameter of such wire is .002 inch requiring a relatively low operating voltage. A similar seal and lead-in construction is formed on end plate 4 for supporting the other end of wire 10. One of the end plates, such as 3, may be put in place with the entire lead-in and seal assembly mounted thereon. The other end plate 4 together with its associated seal and lead-in construction is then mounted with the exception that the lead-in wire is not fused to the glass until after the end plate 4 is screwed into place and until the wire 10 is pulled taut, after which the lead-in is finally sealed to the glass tube associated with end plate 4. Electrostatic shields 11 and 12 of brass or other suitable material are provided for shielding anode wire 10 against stray electromagnetic pickups. Shield 12 is made in the form of two telescoping parts which may be adjustably secured together and held in place by screws 13 so as to provide an adjustable distance between the end of the lead-in wire and the connector or terminal 14 to which a flexible lead-in conductor 15 is connected. Screw threaded holes 16 are provided on one side of block 1 so as to permit mounting of block 1 on a panel or other supporting surface (not shown). In case block 1 is mounted on a panel of an amplifier chassis, a suitable hole is provided in the panel through which a slidable carriage member 17 may extend. A bottom plate 18 secured to block 1 by screws 19 forms a closure for the open rectangular bottom portion of block 1, and completely seals the bottom thereof with the exception of a bore 20 provided therein through which a sample holder 21 is adapted to be moved. More specifically, a barrel 22 of brass, for example, is tightly fitted and rigidly secured to carriage member 17. A screw threaded portion 23 of holder 21 engages a correspondingly screw threaded portion of barrel 22 so that upon rotating of a knurled portion 24 of holder 21, the holder 21 is moved upwardly, as illustrated, that is, radially of cylindrical wall portion 2. A collar or shoulder portion 25 of carriage member 17 forms a well and serves as a stop to limit downward movement of sample holder 21. The upward movement of sample holder 21 is limited by a depending portion of an adjustable stop member 26 which is selectively clamped about the barrel 22 in any vertical position by loosening and subsequently tightening the screw 27 of the clamp. It will be noted that in adjusting the position of clamp 26, the stop portion thereof may be also rotated about the axis of sample holder 21 into any desired position, thus providing a vernier adjustment of the stop member. A pin 28 screwed into sample holder 21 will upon rotation of knurled portion 24 come into contact with stop 26, thus arresting the vertically upward movement of the sample holder. It is generally desirable to prevent the upper surface of sample holder 21 from moving much higher than the upper surface of carriage member 17. In order to prevent leakage between the screw threaded portion of members 21 and 22, these portions are greased with Apiezon N or other suitable grease and furthermore a cap 29 is screw-threaded on to the end of barrel 22, and is sealed in a gas-tight manner thereto by means of a gasket 30 of neoprene or other suitable material which is also coated with grease.

In operation when it is desired to insert a sample within the chamber defined by the inner walls of block 1, barrel 22 is grasped and pulled in a direction at right angles to the plane of Fig. 3 so that carriage member 17 will slide with respect to the fixed tracks or guide members 31. The sliding parts are preferably coated with grease, such as Apiezon N. Tracks 31 are adjustably secured to bottom plate 18 by means of screws 32. Large diameter holes are provided in the track members 31 for receiving screws 32 so as to enable lateral adjustment of the tracks with respect to carriage 17 to accurately align the shoulder or well portion 25 of member 17 with the bore 20 in bottom plate 18 as well as to selectively adjust the pressure between tracks 31 and carriage 17 during relative sliding movement thereof to insure a gas-tight fit.

When the carriage 17 is pulled outwardly to an extent so as to expose sample holder 21 to the outside atmosphere and to easy access by the operator, a radioactive sample may be placed on holder 21. Caution must be taken to see that the sample holder 21 is lowered sufficiently so that the upper surface of the sample just clears the bottom surface of plate 18, thus avoiding introduction of appreciable quantities of air. The barrel 22 is then grasped and pushed in an opposite direction so as to slide carriage 17 and move the sample holder 21 into alignment with bore 20. Upon such alignment knurled portion 24 is rotated so as to raise the sample holder 21, and to bring the sample into position inside of the chamber defined by wall 2. It is desirable to have the sample top surface positioned to be about one millimeter above the surface of the bottom plate 18 so as to provide a solid angle of $2\pi$ steradians to emanations coming out of the radioactive sample. In other words, 50 per cent geometry (neglecting back scattering) is provided. The placement of the sample in approximately the plane of the interior surface of plate 18 will also provide a minimum disturbance of the already existing electrostatic field between the anode wire 10 and the cathode plate 18. If the chamber were constructed so as to approach a cylindrical contour rather than a semi-cylindrical contour as shown, the introduction of the flat sample would distort the electrostatic field to an appreciable extent.

In order to limit the extent of sliding movement of carriage 17 with respect to block 1, adjustable stops 33 and 34 are provided each of which includes a block of metal having an elongated groove through which a bolt extends so as to provide a certain degree of lateral adjustment. In this manner it is impossible to pull carriage 17 all the way out or in to an extent as to detach it from block 1.

One of the most suitable ionizing media for the filling of the counter tube chamber is methane. In general, the saturated hydrocarbons, referred to generally as "self-quenching" gases, particularly of high purity, are found especially suitable since practically no photons are produced. As a result a low external resistance may be used for a signal input. This is especially important for high $\beta$ background. Generally speaking, polyatomic-molecule gases such as $BF_3$, $CH_4$, $C_2H_5OH$, are preferred over the so-called permanent gases such as argon, helium, nitrogen, etc. because the latter gases particularly at high gas amplification produce many photons near the center-wire contributing greatly to the ion production by producing photo-electrons at the cathode, thus resulting in further electron emission at the cathode and the creation of spurious discharges which introduce errors in counting, whereas the former gases do not produce to any appreciable extent photons capable of producing photo electrons. Methane is particularly suitable since the ion amplification thereof when used in a counter is not a critical function of operating potential, hence small disturbances of operating potential will not introduce errors, hence voltage regulation is not a critical factor. This will be more apparent by reference to Fig. 4 which is a graph of counts per minute versus voltage applied to the center wire of a methane filled proportional counter. Curve A illustrates the characteristic resulting from a pure alpha source and shows how the counting rate is practically constant for voltages between 2300 volts and 2500 volts. Curve B, which is to be read in connection with the ordinate axis shown at the right, illustrates the characteristic of both alpha and beta radiations falling on the counter with about $8 \times 10^3$ per minute beta background. It will appear that a somewhat narrower voltage region exists up to about 2450 volts in which alpha particles may be accurately counted despite a high beta background and despite minor fluctuations in voltage of the anode wire. Of the many gases tested methane appears to have one of the flattest characteristic curves for counting rate, versus voltage. Furthermore, a large gain in collected ion charge by wire 10 is possible so that external amplification of the pulse by the amplifier need not be very large. Methane at atmospheric pressure provides a proportional region approximately 1000 volts lower than that for air, and involves no difficulties such as corona discharges and humidity. It is also relatively inexpensive.

While it is possible to use methane or other suitable gas in a static state, that is, to introduce the gas in the counter chamber and then seal the chamber, I have found that due to leakage of air into the chamber, over a period of time, the ionizing medium will change in characteristics thus altering the calibration of the counter tube. In addition, it is difficult to definitely ascertain the pressure of the ionizing medium unless a manometer or other similar instrument is used from time to time for checking the pressure.

In order to overcome these difficulties, I have provided a constant flow of methane or other gas at about atmospheric pressure through the counter chamber in the following manner. Methane is contained in a tank having a suitable reducing valve (not shown). After the pressure of the methane is reduced by such reducing valve, it flows through a small needle valve 40 (Fig. 3) thence through pipe 41 that is sealed to end plate 4 and flows into the counter chamber. The methane flows out of the counter chamber through a pipe 42 extending through and sealed to end plate 3, and then flows through a needle valve 43 forming part of a bubbler 44 filled with a suitable liquid such as an oil, and finally escapes to the surrounding air since methane is not toxic in small quantities and is odorless. The bubbler 44 forms a trap or liquid seal to prevent ingress of air into the counter chamber, and at the same time provides an indicator for indicating to the operator the flow rate of methane gas. Such indication is provided by noting the rate at which the methane gas bubbles emitted from needle valve 43 rise to the surface of the liquid in the bubbler. A slow flow rate is desirable for which the bubble rate may be of the order of one per second. By maintaining the methane flow rate at a fairly constant value, and by maintaining the operating potential at an appreciably constant value, the calibration of the counter tube will not vary as in the case of a static gas-sealed tube.

Instead of using a narrow band, low frequency response amplifier such as commonly used in the art for alpha counters, that is, having constant gain only for frequency bands of less than $10^5$ cycles per second, I have found that by using a wide frequency band, linear amplifier, that is, one that will have constant gain for frequencies beyond 1 megacycle before dropping off in frequency response, much improved response to the sharp counter pulses is obtained. It should be noted that while a desirable frequency response is one that extends beyond 1 megacycle for ordinary alpha counters, it will be apparent that the class of video amplifiers is even more suitable since the frequency response thereof extends up to perhaps 10 megacycles.

By the use of a wide frequency band response, the steep wave fronts of the pulses created near the center wire of the counter tube are maintained throughout the various stages of the amplifier. Furthermore, by the use of a wide band frequency response amplifier, better resolution is obtained.

Furthermore, amplification factors of $10^2$ or $10^3$ are sufficient as distinguished from amplification factors of $10^4$ normally required in narrow frequency band amplifiers thereby reducing the problem of noise level and microphonics. A suitable amplifier is shown in Fig. 5 wherein the counter chamber 1 surrounds the anode 10. This anode is connected to a source of positive D. C. potential in series with an input resistor 50, the opposite side of resistor 50 being connected to the positive side of said source of D. C. potential. In order to increase still further the resolution as well as the breadth of frequency response of the amplifier, an inductance such as 51 is shunted across the input resistor 50. One terminal of the paralleled inductance 51 and resistor 50 is connected to a positive high voltage terminal of the order of 2500 volts, while the other terminal thereof is connected to one of the plates of a condenser 52, the other plate of which is connected to input grid 53 of tube T1 comprising the first stage of the linear, wide frequency band amplifier. A suitable value for resistor 50 is of the order of $2 \times 10^4$ ohms and of inductance 51 is about 50 mh. The value of resistance and inductance are so selected as to provide relatively high damping of the wave trains which result when the circuit has a pulse impressed across it and at the same time it provides a large potential drop across inductance 51. The bridging of inductance 51 across resistor 50 is particularly useful for high counting rates and high beta background. The inductance forms a shock excited network providing a broad tuned input as well as a steeper pulse of large magnitude having a damped wave train, which pulse is fed to the input of the amplifier. In many cases wherein lower counting rates and beta background exist, it is possible to eliminate inductance 51 and to provide solely a resistor 50 of a value, for example, between 10,000 and 100,000 ohms.

Before entering into a detailed description of the amplifier circuit of Fig. 5, it is deemed desirable to describe alternate input circuit schemes which may be used instead of that shown in Fig. 5.

Fig. 6 shows an amplifier input circuit wherein the inductance 51a is in the form of a primary winding of a transformer 54, the secondary winding 55 of which has a terminal connected to the input grid 53 of tube T1, and the other terminal thereof is grounded.

Still another modification of an inductance input network is shown in Fig. 7 where a resistance shunted inductance 56 has one terminal impressed with the high voltage, and the other terminal connected to a condenser 57 and to the anode wire 10. The other plate of condenser 57 is connected to a terminal of a second resistance shunted inductance 58 and to the control grid 53 of tube T1 while the other terminal of inductance 58 is grounded.

Figs. 8 and 9 show more clearly the effect of bridging an inductance across the resistor. Fig. 8 shows the pulse form of a voltage applied to an amplifier input through a resistor solely, whereas Fig. 9 shows the pulse form for an input circuit having an inductance bridged across the resistor. As will be apparent, the pulse in Fig. 9 is much steeper and narrower than that shown in Fig. 8. The total duration time of a negative pulse, that is, the one below the axis in Fig. 9, is of the order of $10^{-6}$ second as distinguished from a duration of about $5 \times 10^{-6}$ second for that shown in Fig. 8. The amplitude of the negative pulse in Fig. 9 may be of the order of three-fourths of that shown in Fig. 8. As described hereinbefore, by properly choosing the values of the resistance and inductance the wave train following the negative pulse in Fig. 9 may be highly damped and reduced to one or two short pulses of negligible value.

While the specific details of the wide frequency band, linear amplifier form no part of the present invention, a typical circuit is nevertheless illustrated in Fig. 5, and will be briefly described hereinafter for a better understanding of the invention.

When an ionizing event takes place in the proportional counter tube, electrons collect on the center wire 10 causing it to drop in potential, thus producing a negative pulse which proceeds to the input grid 53 of the first stage of the linear amplifier. This will cause the anode current of tube T1, preferably a pentode tube, to decrease, thereby causing a decrease in the IR drop across anode resistor 60 and an increase in voltage of anode 61. This increase in voltage is translated to the input grid 62 of tube T2 through an interstage coupling condenser 63. Thus, the potential of input grid 62 increases and causes a decrease in potential of anode 64. By means of a negative feedback circuit including condenser 65, resistor 66 and condenser 67, this decrease in anode potential is reflected in the form of a decrease of potential of cathode 68 of tube T1. By the use of such feedback circuit, which is well-known in the art, a wider frequency band of response as well as greater stability of the amplifier is provided. In other words, since the voltage fed back to cathode 68 is in a direction to oppose the effects of the input voltage appearing on grid 53, fluctuations in the power supply and the like will tend to cancel each other and thus minimize noise. The negative feedback feature also improves the wide frequency band characteristics.

In a like manner, the decrease of potential of anode 64 is applied to grid 69 of tube T3 through the coupling condenser 70 resulting in an increase in voltage of anode 71 of tube T3. By means of coupling condenser 71a, grid 72 of tube T4 increases in voltage and results in a decrease in voltage of anode 73 which is fed through an adjustable resistor 74 and coupling condenser 75 to the input grid 76 of a double triode pulse height selector tube T5. Variation of the resistor 74 changes the pulse height translated to tube T5. That is, if it is desired to cut off beta pulses of greater height to insure translation of only alpha pulses, the slidable contact is moved in a direction towards the grounded terminal of the B voltage. The left triode section, as illustrated, of the double triode tube T5 is normally conducting while the right triode section is normally non-conducting. When a sufficiently negative pulse is applied to the grid of the left triode section, this section becomes non-conducting, and its anode 77 as well as the grid 78 of the right triode section becomes more positive making the right triode section conducting. This will increase the current through the cathode resistor 79 making it become more positive, thus decreasing the amount of negative bias of grid 76 with respect thereto thereby again making the left triode section conducting and restoring it to its normal state. The selector output pulses are of uniform height (approximately 10 to 40 volts) and have a rising time of about $5 \times 10^{-7}$ seconds. The circuit associated with tube T5 is well-known in the art, and includes a glow-discharge tube 80 for maintaining a substantially constant value of voltage across its terminals despite fluctuations in line voltage. The output of tube T5 is connected by means of condenser 81 to a scaler and recorder (not shown). A well-known scaler with a 2500 volt supply may be used with the amplifier and pulse height selector.

If desired a high speed trigger pair which produces large, sharp negative pulses may be inserted between the pulse height selector and scaler.

Thus it will be seen that I have provided an efficient and sensitive proportional counter tube which is limited in sensitivity solely by self-absorption of the radioactive sample rather than by the additional absorption of the thin walls or windows and surrounding air, as is the case with well-known counter tubes wherein the sample is located exteriorly. Furthermore, I have provided a proportional counter tube that maintains its calibration despite extensive use thereof, and which will give a high degree of amplification without the production of spurious pulses; and in addition, I have provided a wide frequency band, linear amplifier and input circuit therefor for use with a proportional counter tube to maintain the steep wave front of the pulses formed in the counter throughout the entirety of the various amplifier stages so as to ultimately produce large separate pulses which can be readily isolated from those produced by the beta ray background generally present.

It will be apparent that modifications will be suggested to those skilled in the art after having had the benefit of the teachings of my invention. For this reason, the invention should not be limited except insofar as set forth in the following claims.

What is claimed is:

1. A radiation counter tube comprising a central electrode and a surrounding substantially cylindrical electrode forming a portion of the counter chamber and having a longitudinal segment cut off therefrom, a sample holder, carriage means for sliding said sample holder longitudinally and in gas tight relationship with respect to said substantially cylindrical electrode so as to selectively move the sample into or out of said counter chamber, and means for adjustably moving said sample holder radially of said substantially cylindrical electrode and normally supporting said sample holder substantially flush with the edges of the longitudinal cut-away portion of said substantially cylindrical electrode.

2. A radiation counter tube comprising a central electrode and a surrounding substantially cylindrical electrode forming a portion of the counter chamber and having a longitudinal segment cut off therefrom, a sample holder, carriage means for sliding said sample holder longitudinally and in gas tight relationship with respect to said substantially cylindrical electrode so as to selectively move the sample into or out of said counter chamber, and means for adjustably moving said sample holder radially of said substantially cylindrical electrode and normally supporting said sample holder substantially flush with the edges of the longitudinal cut-away portion of said substantially cylindrical electrode, said last mentioned means including an adjustable stop member for limiting said radially inward movement of said sample holder.

3. A radiation counter tube comprising an electrode in the form of an elongated metallic block having slightly greater than a semi-cylindrical bore longitudinally thereof forming a longitudinal rectangular opening at one side thereof, a second electrode disposed axially of said bore, and carriage means including a sample holder movable relative to said rectangular opening to permit selective movement of said sample holder into or out of communication with said bore, and means for adjustably moving said sample holder radially inwardly or outwardly of said bore.

4. A radiation counter tube comprising an electrode in the form of a body having a slightly greater than a semi-cylindrical bore therethrough forming a longitudinal rectangular opening on one side of said body, a second electrode positioned axially of said bore, a hole containing plate for closing said rectangular opening with the exception of said hole, carriage means slidable relative to said plate in gas tight relationship therewith, a sample holder supported by said carriage means and adapted to be moved into or out of registry with said hole by said sliding movement, and stop members on said carriage for engaging opposite surfaces of said body to limit sliding movement, in opposite directions, of said carriage relative to said body.

5. A radiation counter tube comprising an electrode in the form of a body having a slightly greater than a semi-cylindrical bore therethrough forming a longitudinal rectangular opening on one side of said body, a second electrode axially of said bore, a hole containing plate for closing said rectangular opening with the exception of said hole, carriage means slidable relative to said plate in gas tight relationship therewith, a sample holder supported by said carriage means and adapted to be moved into or out of registry with said hole by said sliding movement, means for adjustably moving said sample holder radially inwardly or outwardly with respect to the axis of said bore, and stop means on said carriage means for limiting said radial inward and outward movement.

6. A radiation counter tube comprising an electrode in the form of a body having a slightly greater than a semi-cylindrical bore therethrough forming a longitudinal rectangular opening on one side of said body, a second electrode axially of said bore, a hole containing plate for closing said rectangular opening with the exception of said hole, carriage means slidable relative to said plate in gas tight relationship therewith, a sample holder supported by said carriage means and adapted to be moved into or out of registry with said hole by said sliding movement, an abutment on said carriage means cooperating with an abutting portion of said sample holder to serve as a stop therefor in a direction away from said bore, and an adjustable stop member cooperating with a portion of said sample holder to limit movement of said sample holder in a direction towards said bore.

7. A radiation counter tube comprising an electrode in the form of a body having a slightly greater than a semi-cylindrical bore therethrough forming a longitudinal rectangular opening on one side of said body, a second electrode axially disposed in said bore, a hole containing plate for closing said rectangular opening with the exception of said hole, carriage means slidable relative to said plate in gas tight relationship therewith, a sample holder supported by said carriage means and adapted to be moved into or out of registry with said hole by said sliding movement, an internally screw threaded barrel forming part of said carriage means and in screw threaded engagement with a screw threaded portion of said sample holder to allow movement of said sample holder radially inwardly and outwardly with respect to the axis of said bore, a clamp adjustably secured to said barrel and engageable with a protruding portion of said sample holder to limit radially inward movement of said sample holder with respect to said bore axis.

8. A radiation counter tube comprising an electrode in the form of a body having a slightly greater than a semi-cylindrical bore therethrough forming a longitudinal rectangular opening on one side of said body, a second electrode axially of said bore, a hole containing plate for closing said rectangular opening with the exception of said hole, carriage means slidable relative to said plate in gas tight relationship therewith, a sample holder supported by said carriage means and adapted to be moved into or out of registry with said hold by said sliding movement, an internally screw threaded cylindrical member forming part of said carriage means, said sample holder being in the form of a substantialy cylindrical stem having a screw threaded portion in engagement with the screw threaded portion of said cylindrical member and having a head portion on which the sample is placed, which head portion is adapted to seat in a well portion of said carriage means to limit radially outward movement of said sample holder relative the axis of said bore, a radially extending pin on said stem, an adjustable clamp mounted on said cylindrical member and having a stop that is engageable with said pin to limit radially inward movement of said sample holder relative said bore axis.

9. A radiation counter tube comprising in combination, an inner electrode, an outer electrode surrounding the inner electrode and provided with an aperture adapted to permit the insertion of radioactive samples, and sample holding means mounted adjacent to the aperture to position samples within the aperture substantially flush with the inner surface of the outer electrode, said means including a conducting surface electrically connected to the outer electrode to support a sample, said surface substantially filling the aperture.

10. A radiation counter tube comprising in combination, an inner electrode, an outer electrode surrounding the inner electrode, said outer electrode having a flat surface provided with an aperture adapted to permit the insertion of a radioactive sample, and sample holding means mounted adjacent to the aperture to position a sample in the aperture substantially flush with the flat inner surface of the outer electrode, said means including a conducting surface electrically connected to the outer electrode to support a sample, said surface substantially filling the aperture.

11. A radiation counter comprising, in combination, a first tubular electrical conducting electrode provided with an aperture therein, a second electrically conducting electrode mounted within the first electrode and insulated therefrom, and means to seal the atmosphere from the region between the two electrodes including means to position a sample in the aperture of the first electrode, said means including an electrically conducting plate for holding said sample confronting the aperture and having a shape conforming to the aperture.

12. A radiation counter comprising the elements of claim 11 in combination with means for flowing a gas at substantially atmospheric pressure through the region between the electrodes of the counter.

JOHN A. SIMPSON, Jr.

REFERENCES CITED

The following references are of record in the file of this patent:

UNITED STATES PATENTS

| Number | Name | Date |
|---|---|---|
| 1,808,709 | Blake | June 2, 1931 |
| 2,316,361 | Piety | Apr. 13, 1943 |
| 2,349,225 | Scherbatskoy | May 16, 1944 |
| 2,479,201 | Bleeksma | Aug. 16, 1949 |

OTHER REFERENCES

Brown, Physical Review, vol. 59, pp. 954–956, June 1941.

Brubaker et al., Review of Scient. Instr., vol. 8, pp. 254–258, July 1937.